United States Patent [19]

Sobotta et al.

[11] Patent Number: 4,614,422

[45] Date of Patent: Sep. 30, 1986

[54] CONTROLLER FOR TRIMMING COPY SHEETS FROM A MATERIAL WEB IN A COPYING MACHINE

[75] Inventors: Reinhard Sobotta, Siegen-Eisern; Heinrich Isermann, Siegen, both of Fed. Rep. of Germany

[73] Assignee: Meteor-Siegen Apparatebau Paul Schmeck GmbH, Fed. Rep. of Germany

[21] Appl. No.: 717,722

[22] Filed: Mar. 29, 1985

[30] Foreign Application Priority Data

Apr. 3, 1984 [DE] Fed. Rep. of Germany ....... 3412413

[51] Int. Cl.$^4$ ............................................. G03B 29/00
[52] U.S. Cl. ...................................... 355/29; 355/55; 355/14 C
[58] Field of Search .............. 355/55, 57, 29, 5, 3 ER, 355/14 C

[56] References Cited

PUBLICATIONS

IBM News Release & Sales Guide, 3-6-84.

Primary Examiner—Monroe H. Hayes
Attorney, Agent, or Firm—Wood, Herron & Evans

[57] ABSTRACT

A controller for trimming copy sheets from a material web in a copying machine is disclosed which utilizes a keypad for easy and error-free input of the widths of document margins without measuring them or converting them from one unit of measurement to another (e.g., metric to U.S. units). The keypad comprises an illuminated bar display one each for the leading and for the trailing document margin. The optical display value of the illuminated bar displays can be set, with the aid of document margin keys provided for that purpose, equal to the width of the document margins, with a digital value corresponding to the selected optical display value being generated and kept available for input to the controller.

10 Claims, 3 Drawing Figures

CONTROLLER FOR TRIMMING COPY SHEETS FROM A MATERIAL WEB IN A COPYING MACHINE

BACKGROUND OF THE INVENTION

This invention relates to a controller for trimming copy sheets from a material (paper) web in a copying machine, and particularly a keypad therefor. Specifically, the present invention relates to controlling a trimming device wherein the width of the margins of the original document and the intended width of the margins of the copy sheet are indicated by keypad settings to which the trimming device is responsive for providing a sheet of appropriate size onto which the copy is developed.

An example of a copying machine employing a trimming device and a controller of this type is disclosed in the German patent disclosure No. 31 43 112. There, the copy sheet is trimmed from a material web in accordance with the settings on the keypad to indicate the width(s) of the margin(s) of the leading and/or trailing edge of the original and the copy. In keypads of this type, the width of the leading and/or trailing original document margin ($OR_L$, $OR_T$, respectively) and the width of the desired leading and/or trailing copy sheet margin ($PR_L$, $PR_T$, respectively) are entered and stored. A control unit comprises a device for sensing the leading and trailing edge of the document at a specific spacing A in the feed direction of the document ahead of the trimming device. Control pulses are emitted when the leading or trailing edge of the document has traveled the distance $A \pm (PR - OR)_{L,T}$ from the sensing device. The pulse triggered by the leading document edge controls the advance of the material web, and the control pulse triggered by the trailing document edge actuates the trimming device for severing the copy sheet. The margin widths of the copy are generally dimensioned from the margin widths of the original document and are thus of the desired widths.

One disadvantage of this prior device is that the leading and trailing document margins must be measured and their dimensions separately entered. Alternatively, other input elements may be required to assist in entering the correct margins. Further, the measuring operation and the subsequent entering are in the nationally applicable unit of measure (e.g., metric). Hence, exporting the device to countries using nonmetric measuring systems necessitates additional conversion circuits which convert the entered margin widths to the measuring system in which the specific distance A is specified.

It has been one objective of the present invention to provide a controller for a copying machine trimming device with a keypad wherein the width of the document margins can be entered dependably and in a simple manner without a separate measuring operation.

A further objective of the present invention has been to provide a controller for a copying machine trimming device with a keypad wherein the width of the document margins is entered independent of the applicable unit of measure.

SUMMARY OF THE INVENTION

In accord with these objectives, and in preferred form, a controller for a copying machine trimming device is provided in which the widths of the document margins are entered into a keypad by document margin keys which continuously cause an illuminated bar display to change so as to correspond graphically to the width of the document margins. The displays internally generate a digital value equaling the selected display value, for entering into the control circuit which controls operation of the trimming device.

The copying machine preferably further comprises an advancing unit under control of a control circuit for advancing a paper web with a predetermined velocity past a trimming device, and for advancing the document to a copying station. The control circuit generates pulses to the advancing unit and trimming device for starting the paper web and for trimming the copy sheet therefrom in response to the previously entered margin width(s) of the document and preselectable widths of margin(s) for the copy.

Specifically, with respect to the keypad, the leading or trailing edge of the document can be caused to coincide with a zero reference line on the display and the illuminated bar display subsequently activated, by means of the document margin keys, until the optical display value and/or the selected analog display length coincides with the width of the document margin at that edge. In the process, the illuminated bar display generates a digital value corresponding to the analog display value which indicates the width of the margin of the document. The digital value is entered and/or stored in the control circuit. The respective margin width is thus simulated as a display length or display value of the illuminated bar display while the keypad automatically generates a digital value which is available for further processing.

One advantage of the present invention is that a separate measuring operation is unnecessary. Further, input of a measured value in a specific unit of measure is obviated and, as the case may be, the conversion of the entered value to another unit of measure. Additionally, input errors are reduced.

Preferably, a first illuminated bar display is provided for the leading edge margin and a second illuminated bar display is provided for the trailing edge margin. Also, a first document margin key for increasing the display value and a second document margin key for reducing the display value are provided for each illuminated bar display. The document margin keys are preferably fashioned as restoring switches which, when depressed, cause the display value of the illuminated bar displays to change continuously, for instance time-proportionally. When the restoring switches are released, the selected display value is retained. This makes it easy to adjust the display length of the illuminated bar display so as to coincide with the width of the margin of the document.

The illuminated bar displays consist preferably of discrete light-emitting diodes (LED's) which are arranged side-by-side in a straight line at a specific mutual and constant spacing. During actuation of a restoring switch, the LED's are sequentially addressed and activated, for instance by a counter which then simultaneously holds the corresponding digital value.

The keypad may also preferably provide copy margin keys to enter programmable/programmed fixed values for the margin widths of the copy. Additionally, the keypad is preferably provided accessory keys, actuation of which enters specific fixed values for the leading and/or trailing document margin width in the control circuit and, preferably, causes those values to be graphically displayed on the illuminated bar displays.

The values for $OR_L$, $OR_T$, $PR_L$, $PR_T$ are thus provided to a control circuit such as disclosed in German patent disclosure No. 31 43 112 which is hereby incorporated herein by reference. However, with the keypad of the present invention, the variables ($OR_L$, $OR_T$, $PR_L$, $PR_T$) are easily set without regard to the unit of measure and without measuring the paper.

BRIEF DESCRIPTION OF THE DRAWINGS

The objectives and advantages of this invention will be more apparent from the following detailed description taken in conjunction with the drawings in which.

DETAILED DESCRIPTION OF THE DRAWINGS

Figure 1:
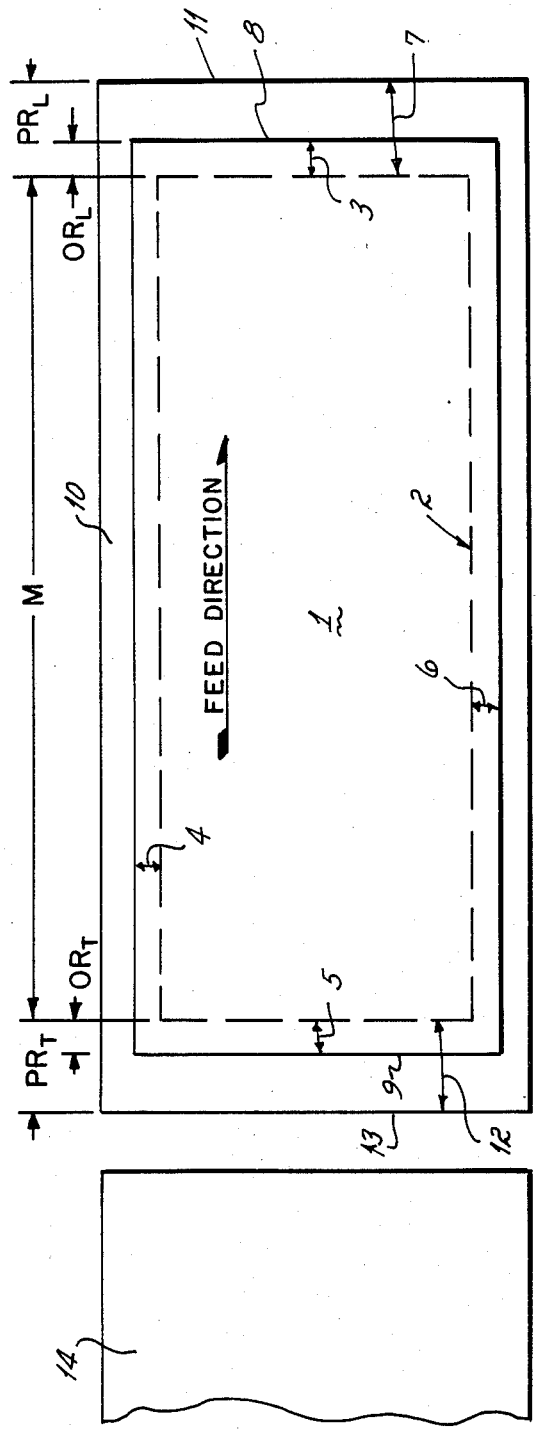
FIG. 1 is a plan view of an original document overlaying a copy sheet.

With reference to FIG. 1 there is shown a plan view of an original document 1 overlaying a copy sheet 10. The original document 1, for example a transparent drawing format, has a rectangular trim line 2 thereon shown as a dotted line in FIG. 1. Trim line 2 defines the net drawing or text area of original 1. Between the edges of document 1 and its trim line 2 are margins, 3 through 6, one to a side. In particular, leading margin 3 between leading edge 8 of document 1 and nearby trim line 2 is of a particular width $OR_L$ and trailing margin 5 between trailing edge 9 of original 1 and nearby trim line 2 is of a particular width $OR_T$. Similarly, copy 10 has a leading margin 7 defined between its leading edge 11 and nearby trim line 2 and a trailing margin 12 defined between its trailing edge 13 and nearby trim line 2. Leading margin 7 and trailing margin 12 are of widths $PR_L$ and $PR_T$, respectively. Thus, as can be seen, copy 10 will have the same net drawing or text area as original 1 but may have different margin widths. Copy sheet 10 has been severed from the leading edge of web 14 and is shown spaced therefrom as it advances from the paper roll 30 (FIG. 2).

Figure 2:
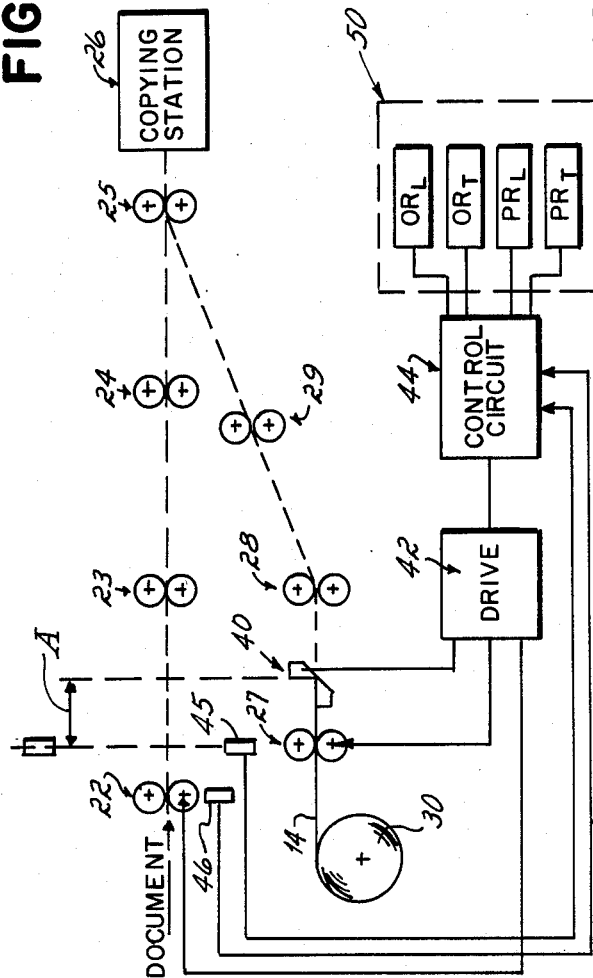
FIG. 2 is a block diagram of a copying machine embodying the trimming device and keypad of the invention.

With reference to FIG. 2, there is shown a block diagram of a copying machine 20 embodying the principles of the present invention. A plurality of roller pairs 22 through 25 advance original document 1 to the copying station 26. Additional roller pairs 27 through 29 advance a material web 14 from a supply roll 30 past a trimming device 40 to cut the copy sheet from web 14. Further, roller pairs 28, 29 advance the copy sheet 10 in register with document 1 to copying station 26. A drive 42 is controlled by control circuit 44 to selectively drive roller pairs 22 through 25 and 27 through 29, comprising an advancing unit, and to selectively operate trimming device 40 in response to control pulses generated by sensing leading edge 8 and trailing edge 9 of document 1, respectively.

Figure 3:
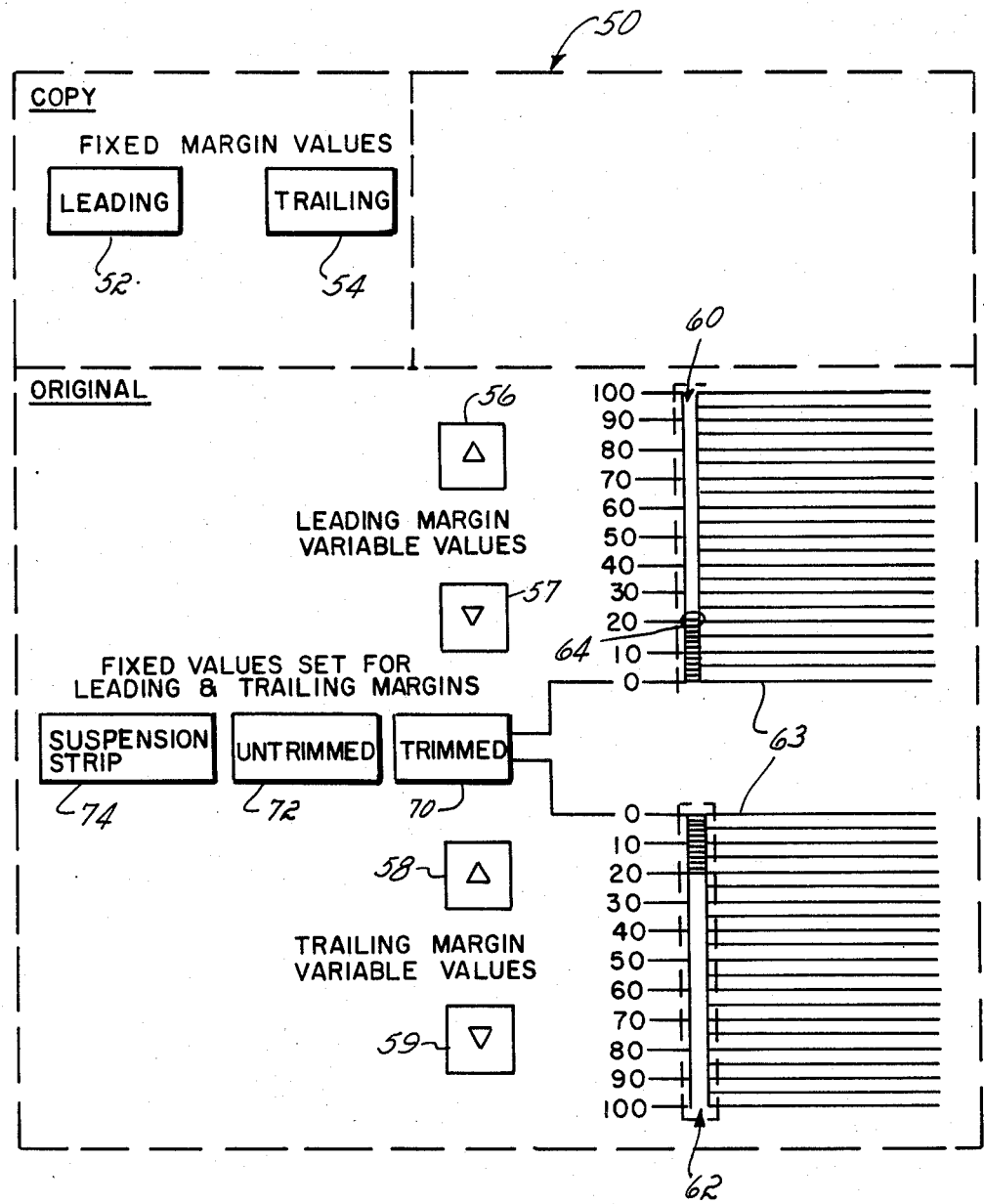
FIG. 3 is a plan view of a keypad in accordance with the principles of this invention.

Control circuit 44 includes a storage means (not shown) and receives the values of $OR_L$, $OR_T$ and $PR_L$, $PR_T$ respectively from keypad 50 (FIG. 3). Control circuit 44 further includes a sensor 45, for example a LED-diode-sensor unit fixed a predetermined distance A ahead of the position of trimming device 40 in the direction of feed of document 1. Control circuit 44 is coupled to a tachometer 46 fixed at first roller pair 22 of the document advance mechanism for generating a pulse count to control circuit 44, said pulse count being proportional to the rate of advance of document 1.

Within control circuit 44, the distance A between sensor unit 45 and trimming device 40 is stored. Further, the actual values of $OR_L$ and $OR_T$, i.e. the width of the leading and trailing document margins 3, 5, respectively, and the desired widths $PR_L$, $PR_T$ of the desired leading and trailing copy sheet margins, 7, 12, respectively, are inputted and stored from keypad 50 (FIG. 3).

Control circuit 44 calculates the distance $A-(PR_L-OR_L)$ as the leading edge 8 of document 1 travels past sensor unit 45. Once document 1 has travelled this calculated distance past sensor unit 45 as computed by reference to the pulses from tachometer 46, the advance of the material web 14 is started with the same velocity (as indicated by pulses from tachometer 46) by a control pulse generated from control circuit 44 to drive 42. Copy sheet 10 will thus be brought into alignment with document 1 at copying station 26 with a leading margin 7 of the desired width $PR_L$ relative to trim line 2.

If a width of $PR_T$ of the trailing margin 12 of the copy sheet 10 is desired, control circuit 44 calculates the distance $A+(PR_T-OR_T)$ and issues a control pulse when the trailing edge 9 of the document has travelled this distance past sensor unit 45 for actuating trimming device 40. The trailing margin 12 of copy sheet 10 thus will have the desired width $PR_T$.

The widths of margins entered by the user (not shown) and the distances $A\pm(PR_{L,T}-OR_{L,T})$ are converted by control circuit 44 into time intervals. The control pulses are generated after respective time intervals in which the leading and trailing edge of the document have travelled the respective distances. A simple way to realize the conversion of the distances into time intervals is given by pulse tachometer 46 fixed at first roller pair 22 of the document advance mechanism, the generated number of pulses of tachometer 46 being proportional to the travelled distance of document 1. The values $OR_L$, $OR_T$ and $PR_L$, $PR_T$ and the predetermined distance A are entered into the control and logic device as digital values having the same distance/time/count scale as the tachometer 46.

With reference to FIG. 3, there is shown the keypad 50. Keypad 50 comprises a first copy margin key 52 for entering a fixed or programmed/programmable fixed value for the leading margin width $PR_L$ of copy sheet 10. A second copy margin key 54 serves to enter fixed or programmed/programmable fixed values for the trailing margin width $PR_T$ of copy sheet 10. If desired, several first copy margin keys 52 and several second copy margin keys 54 can be provided for various fixed values.

For setting the lengths $OR_L$, $OR_T$ of the leading and/or trailing document edges there is an illuminated bar display 60, 62 each consisting of a number of discrete light-emitting diodes 64 which are arranged side-by-side in a straight line. Each of the illuminated bar displays 60, 62 comprises a zero reference line 63. The optical display value and/or the optical display length of the illuminated bar displays 60, 62 can be selected with the aid of the document margin keys 56, 57, 58, 59. Additionally, each illuminated bar display 60, 62 includes circuitry (not shown) which generates a digital value corresponding to the respective selected display value. The digital value is transmitted to the control circuit 44 (FIG. 2). As described above, the control circuit 44 (FIG. 2) such as disclosed in aforesaid German patent disclosure No. 31 43 112, scans the leading edge and the trailing edge of the document during its advance at sensor 45 and, in accordance with the desired lengths $PR_L$, $PR_T$ of the leading and trailing copy edges and in response to the lengths $OR_L$, $OR_T$ of the leading and trailing document edges, emits control pulses for controlling the advance of the material web 14 and for the trimming device 40 which severs the copy sheets in accordance with the size of the respective document and the desired edge lengths from a continuous web 30 of material, e.g., paper.

The display value of the illuminated bar display 60, for the width of leading margin 3 of document 1 is selected with the aid of a first document margin key 56 which permits increasing the display value, and a second document edge key 57 which permits reducing the display value.

The illuminated bar display 62 for the width of trailing margin 5 of document 1 is similarly set with the aid of two document margin keys 58, 59, with a first document margin key 58 being provided for increasing the display value and a second document margin key 59 for reducing the display value.

The document margin keys 56 through 59 are designed as restoring switches whose actuation and/or pressing causes the display value of the illuminated bar displays 60, 62 to change continuously during the actuation interval. An electronic counter (not shown) is provided for each bar display 60, 62. The counter is driven by a clock (not shown) and is responsive to the actuation of associated document edge keys 56, 57 or 58, 59. In response to actuation of key 56 or key 58, as appropriate, the respective counter is clocked and will count sequentially upwardly. Conversely, in response to actuation of key 57 or key 59, as appropriate, the respective counter counts sequentially downwardly. The output of the counter is coupled to the light-emitting diodes 64 and is operable to sequentially address and energize or de-energize them in accordance with the state of the counter (e.g., the first 3 are energized in a first count state and the first 7 are energized in a second, higher count state). Also, the output of the counter is a digital value corresponding to the selected display value of the illuminated bar display 60, 62.

The keypad 50 also includes accessory keys 70, 72, 74 upon actuation of which predetermined fixed values for the length $OR_L$, $OR_T$ of the leading and trailing document margins are made available for inputting to control circuit 44 and optically displayed as a display value of the illuminated bar displays 60, 62. A first accessory key 70 serves to input the width for a "trimmed margin." Since the margin widths are always measured from the trim line 2 of the documents, the width for the "trimmed margin" equals zero.

A second accessory key 72 serves to input the fixed width for an "untrimmed margin," which can be programmed.

A third accessory key 74 inputs the fixed specification of the width for a suspension strip (not shown) by which, for instance, the trailing document margin, can be increased.

For entering the widths $OR_L$, $OR_T$ of the leading and trailing document margins 3, 5, respectively, the trim line 2 near the leading and/or trailing edge 8 or 9 of respective document 1 is placed coincident with zero reference line 63 of the illuminated bar display 60, 62. Next, by actuation of the document margin keys 56, 57 and/or 58, 59, the display value or the display length of the illuminated bar display 60, 62 is set to coincide graphically with the leading and/or trailing margin of the document. In this way, the leading and trailing margins are simulated, by means of the illuminated bar display, as an illuminated bar at 1:1 scale, and a digital value corresponding with the selected display value is automatically generated and made available for input to control circuit 44. The foregoing thus accomplishes inputting the margin width(s) without measuring and/or converting the dimensions.

Having described the invention what is claimed is:

1. A controller for trimming copy sheets from a material web in a copying machine responsive to keypad settings entered into said keypad, the keypad comprising:
    illuminated bar display means for graphically displaying an optical display value corresponding in length to at least one margin width of an original document;
    document margin key means for altering said length of said optical display value to visually correspond to said margin width of said originally document;
    digital value generating means responsive to at least one of said document margin key means and said illuminated bar display means for generating a digital value corresponding to said optical display value for controlling operation of a copying machine trimming device.

2. In the controller of claim 1, said document margin key means comprising a first key means for increasing said optical display value and a second key means for reducing said optical display value.

3. In the controller of claim 2, said first and second key means being restoring switch means which when one or the other is activated, said display value of said illuminated bar display means changes continuously upwardly or downwardly, respectively.

4. In the controller of claim 3, said display values of said illuminated bar display means changing in proportion to time during actuation of either of said restoring switch means.

5. In the controller of claim 1, said illuminated bar display means comprising a plurality of adjacent discrete light-emitting diodes which are arranged at a given spacing, said diodes being responsive to said document margin key means wherein said light-emitting diodes are activated sequentially during actuation thereof.

6. In the controller of claim 1, said keypad further comprising accessory key means upon actuation of which said illuminated bar display means will display a predetermined optical display value for said margin width.

7. In the controller of claim 5, said illuminating bar display means generating a digital signal which signal is defined by the length of said optical display value, said optical display value length being defined between a zero reference line on said keypad and the last of said energized light-emitting diodes.

8. In the controller of claim 7, said optical display value length being equal to said document margin width.

9. In the controller of claim 1, said keypad further comprising copy margin key means for entering the desired width of at least one margin of said copy sheet.

10. A copying machine for copying the images from an original document having leading and trailing margins, each of predetermined width, onto a copy sheet having leading and trailing margins, each of predetermined desired width, said copying sheet being severed from its material web by a trimming device and said copying occurring at a copying station, the copying machine comprising:

keypad means for entering by an operator said original document predetermined leading and trailing margin widths;

illuminated bar display means on said keypad for graphically displaying first and second optical values corresponding to said document leading and trailing margin widths, respectively;

document margin key means for setting said optical display values, said illuminated bar display means further generating a digital value corresponding to said first and second optical values;

copy margin key means for entering said predetermined desired widths for said copy sheet margins, said copy margin key means further generating a digital value corresponding to said predetermined desired widths;

advancing means for advancing said original document to said copying station and for advancing said material web past said trimming device, said advancing means further for advancing said copy sheet severed from said web to said copying station;

control circuit means for generating control pulses to said advancing means and to said trimming device for starting the material web and for trimming said copy sheet therefrom in response to said digital values corresponding to said first and second optical display values and to said digital values corresponding to said predetermined desired widths of leading and trailing margins of said copy sheet, said control circuit means further including sensing means for sensing said leading and trailing edges of said original document during its advance and for generating said control pulses;

whereby said original document and said copy sheet are advanced to said copy station in registration and said copy sheet will have margins of said predetermined desired widths.

* * * * *